(12) United States Patent
Chen

(10) Patent No.: US 8,615,196 B2
(45) Date of Patent: Dec. 24, 2013

(54) PORTABLE APPARATUS FOR SUPPORTING ELECTRONIC WALLET

(75) Inventor: Chien-Sheng Chen, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 261 days.

(21) Appl. No.: 13/114,396

(22) Filed: May 24, 2011

(65) Prior Publication Data

US 2011/0294418 A1  Dec. 1, 2011

(30) Foreign Application Priority Data

May 27, 2010 (TW) ................................ 99116947 A

(51) Int. Cl.
*H04B 7/00* (2006.01)

(52) U.S. Cl.
USPC ....... 455/41.2; 455/558; 455/168.1; 235/441; 713/192

(58) Field of Classification Search
USPC ......... 455/41.2, 558, 168.1, 344, 127.4, 3.06, 455/562.1, 575.7; 235/441, 380; 713/192, 713/172
See application file for complete search history.

(56) References Cited

U.S. PATENT DOCUMENTS

| | | | |
|---|---|---|---|
| 7,597,250 B2 * | 10/2009 | Finn | 235/380 |
| 8,005,426 B2 * | 8/2011 | Huomo et al. | 455/41.2 |
| 8,078,225 B2 * | 12/2011 | Kargl et al. | 455/558 |
| 8,335,921 B2 * | 12/2012 | von Behren et al. | 713/164 |
| 8,335,932 B2 * | 12/2012 | von Behren et al. | 713/192 |
| 8,352,749 B2 * | 1/2013 | von Behren et al. | 713/192 |
| 8,364,203 B2 * | 1/2013 | Morel et al. | 455/558 |
| 2006/0187040 A1 * | 8/2006 | Sweeney | 340/572.1 |
| 2006/0219776 A1 * | 10/2006 | Finn | 235/380 |
| 2009/0275364 A1 * | 11/2009 | Morel et al. | 455/558 |
| 2010/0093412 A1 * | 4/2010 | Serra et al. | 455/575.8 |
| 2012/0135681 A1 * | 5/2012 | Adams et al. | 455/41.1 |
| 2012/0159447 A1 * | 6/2012 | Boisde et al. | 717/124 |
| 2012/0230489 A1 * | 9/2012 | Cho | 380/270 |

FOREIGN PATENT DOCUMENTS

| | | |
|---|---|---|
| CN | 101013903 | 8/2007 |
| CN | 101414395 | 4/2009 |
| CN | 101515814 A | 8/2009 |
| CN | 100590989 C | 2/2010 |
| TW | 200803435 A | 1/2008 |

OTHER PUBLICATIONS

Taiwan Intellectual Property Office, "Office Action", Mar. 25, 2013, Taiwan.
State Intellectual Property Office of the People's Republic of China, "Office Action", May 6, 2013, China.

* cited by examiner

*Primary Examiner* — Minh D Dao
(74) *Attorney, Agent, or Firm* — WPAT, PC; Justin King

(57) ABSTRACT

A portable apparatus is capable of switching between a plurality of smart cards and associated circuits to provide a user various independent electronic wallet functions via a single portable apparatus, thereby increasing utilization flexibility and convenience. The portable apparatus includes at least a first smart card and a second smart cart, a near-field communication (NFC) unit, and a control circuit. The first smart card and the second smart card respectively include a first interface and a second interface. The NFC unit is coupled to the first smart card and the second smart card via the first interface and the second interface, respectively. The NFC unit is capable of performing NFC with external apparatuses. The control circuit controls the NFC unit to communicate with either the first smart card or the second smart card using control signals.

14 Claims, 7 Drawing Sheets

US 8,615,196 B2

PORTABLE APPARATUS FOR SUPPORTING ELECTRONIC WALLET

CROSS REFERENCE TO RELATED PATENT APPLICATION

This patent application is based on Taiwan, R.O.C. patent application No. 099116947 filed on May 27, 2010.

FIELD OF THE INVENTION

The present invention relates to an electronic wallet, and more particularly, to a portable apparatus for supporting an electronic wallet.

BACKGROUND OF THE INVENTION

In recent years, various electronic payment and electronic transaction functions using a mobile phone with an electronic wallet function has become more and more popular. A common application is where the mobile phone serves as a contactless smart card from which value of an electronic wallet is added or deducted provided that the mobile phone is placed within a radio sensing range of a reader supporting the electronic wallet function, e.g., the radio sensing range is within a radius of around 10 centimeters. FIG. 1 is a block diagram of a mobile phone 10 having the foregoing electronic wallet function in the prior art. The mobile phone 10 communicates with an external near-field communication (NFC) reader 16 via the NFC technique. The mobile phone 10 comprises a subscriber identity module (SIM) card 11, a security chip 12, an NFC chip 13, an antenna 14, and a control circuit 15. When the mobile phone 10 is within a sensing range of the NFC reader 16, the NFC chip 13 writes via the antenna 14 information (e.g., value-added/value-deducted information) from the NFC reader 16 to the security chip 12, or responds data (e.g., available balance) stored in the security chip 12 to the NFC reader 16.

However, following problems may occur when the mobile phone 10 is applied to perform the electronic wallet function. A first problem may occur when a user replaces a mobile phone, the data (e.g., available balance) originally stored in the security chip 12 cannot be accessed and transmitted to a new mobile phone. A second problem may occur, since the NFC chip 13 is only powered by a battery (not shown) of the mobile pone 10, the battery needs to have remaining power when the mobile phone 10 performs electronic payment. Therefore, a situation may occur where after a user enters a railway station, he cannot leave the railway station since the battery becomes empty due to frequent utilization of the mobile phone 10 (e.g., answering a phone call). The foregoing problems may incur significant inconveniences of the user.

To solve the foregoing problems, a Single Wire Protocol (SWP) for accessing an SIM card by a mobile phone via the NFC technique is developed. As shown in FIG. 2, a mobile phone 20 comprises an SIM card 21 conforming to the SWP, an NFC chip 23 conforming to the SWP, an antenna 24, and a control circuit 25. When a battery of the mobile phone 20 becomes empty, the NFC chip 23 can generate power supply by electromagnetic waves transmitted from an NFC reader to maintain operation. Data originally stored in a security chip is stored into the SIM card 21 and is applied to different mobile phones. However, since most electronic wallet function providers, e.g., bank systems, public transport system, and the like, independently operates, the electronic wallet functions cannot be integrated to a single SIM card released by a telecommunication company thereby creating limitations of the service range of an electronic wallet function supported by the SIM card 21.

SUMMARY OF THE INVENTION

In view of the foregoing issues, one object of the present invention is to provide a portable apparatus for supporting an electronic wallet function. The portable apparatus has a design of switching between various smart cards and associated circuits to provide user various independent electronic wallet functions via a single portable apparatus thereby increasing utilization flexibility and convenience.

According to an embodiment of the present invention, a portable apparatus comprises a first smart card having a first interface; a second smart card having a second interface; an NFC unit, coupled to the first smart card via the first interface and coupled to the second smart card via the second interface; and a control circuit, coupled to the NFC unit, for controlling the NFC unit to communicate with either the first smart card or the second smart card.

According to another embodiment of the present invention, a portable apparatus comprises a first smart card and a second smart card each comprising an interface; an NFC unit; a switch for selectively connecting the NFC unit to either the interface of the first smart card or the interface of the second smart card according to a control signal; and a control circuit for generating the control signal.

According to yet another embodiment, a portable apparatus comprises an NFC unit; a control circuit, for generating a control signal; a first smart card and a second smart card, each comprising an interface; a first switch, for switching the interface of the first smart card between the NFC unit and the control circuit according to the control signal; and a second switch, for switching the interface of the second smart card between the NFC unit and the control circuit according to the control signal.

DETAILED DESCRIPTION OF THE PREFERRED EMBODIMENT

A smart card, or so-called integrated circuit (IC) card, as implemented in the present invention, is referred to as various chips having built-in IC circuits, which can be classified as a contact smart card, a contactless smart card, or a smart card with a telecommunication function, e.g., an SIM card or a universal integrated circuit card (UICC).

Figure 1:
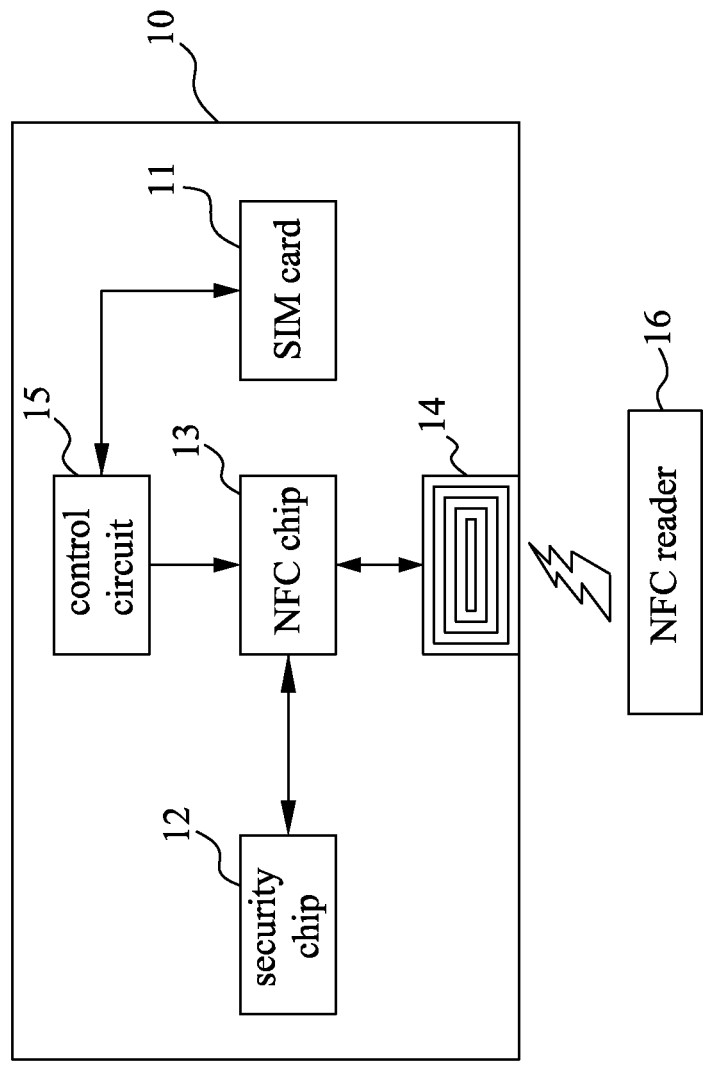
FIG. 1 is a block diagram of a mobile phone for performing an electronic wallet function in the prior art.
Figure 2:
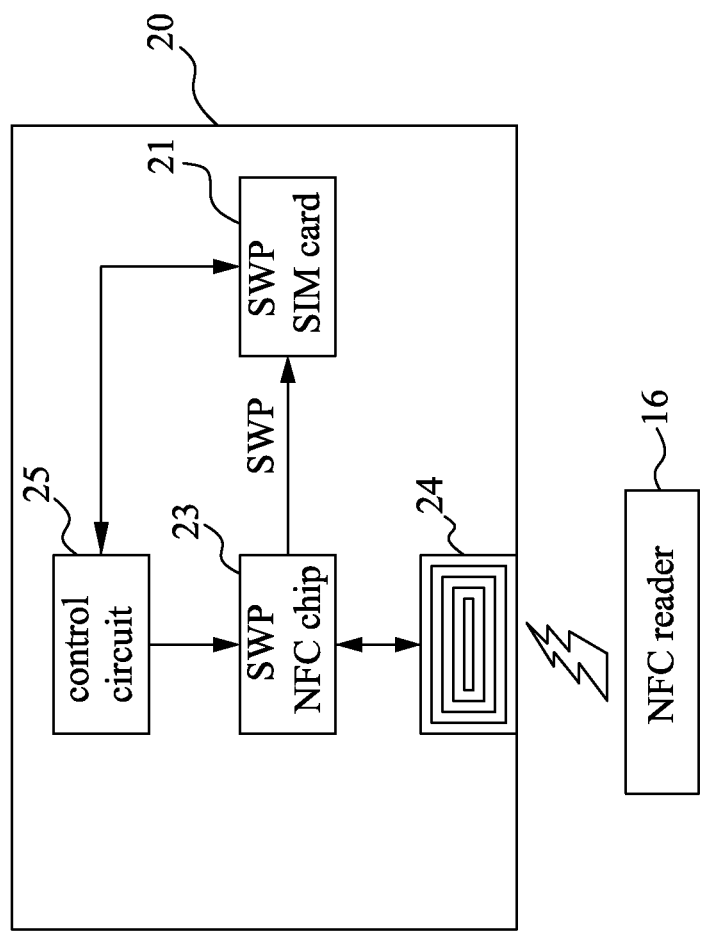
FIG. 2 is a block diagram of another mobile phone for performing an electronic wallet function in the prior art.
Figure 3:
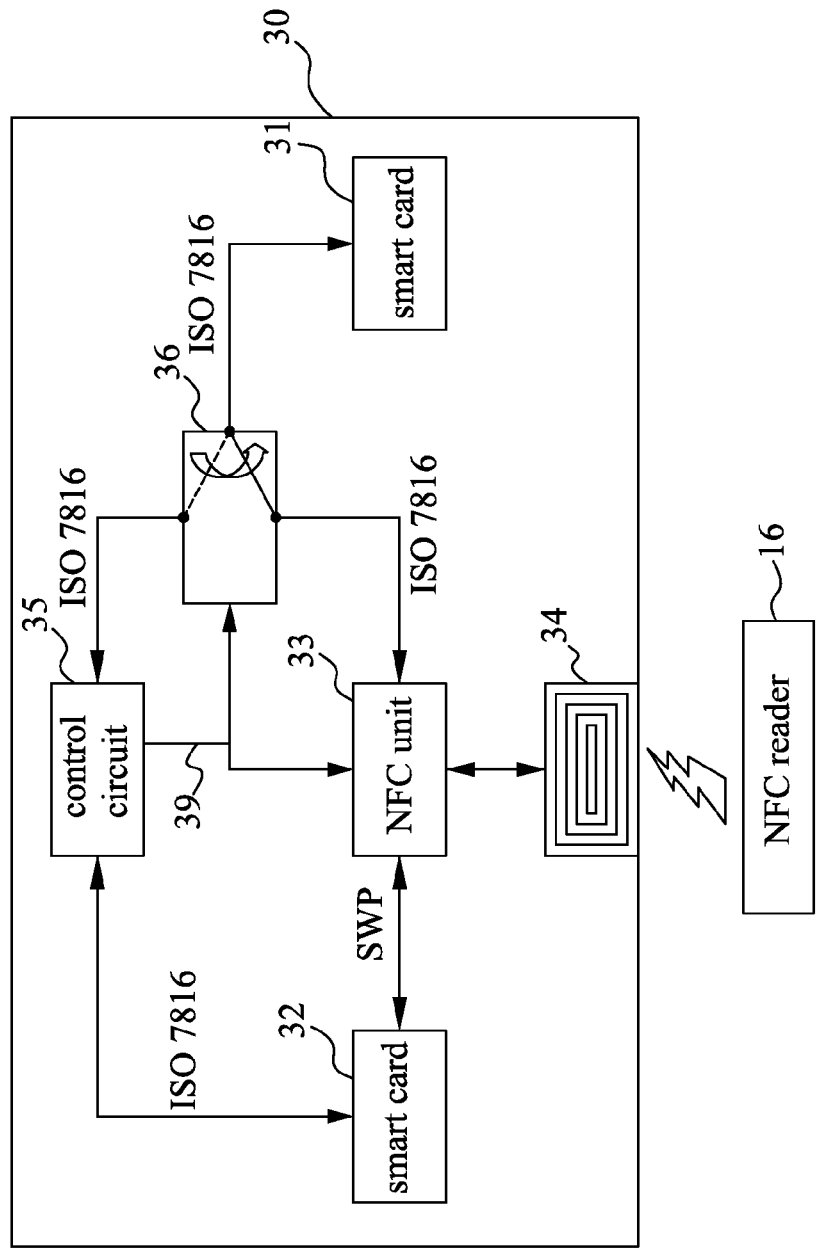
FIG. 3 is a block diagram of a portable apparatus for supporting an electronic wallet function in accordance with a first embodiment of the present invention.

FIG. 3 is a block diagram of a portable apparatus for supporting an electronic wallet function in accordance with a first embodiment of the present invention. A portable apparatus 30 comprises smart cards 31 and 32, an NFC unit 33, an antenna 34, a control circuit 35, and a switch circuit 36. The smart card 31 comprises a first interface, e.g., an International Organization for Standardization (ISO) 7816 interface (i.e., a standard interface of the contact smart card), and is coupled to either the NFC unit 33 or the control circuit 35 via the switch circuit 36, which switches according to a control signal 39 generated by the control circuit 35. The smart card 32 comprises a second interface for connecting to the NFC unit 33 as shown in FIG. 3, e.g., the second interface is an SWP interface. The smart card 32 further comprises an interface, e.g., an ISO 7816 interface, which is connected to the control circuit 35. The antenna 34 coupled to the NFC unit 33 is for performing communicating between the NFC unit 33 and an external NFC reader 16. The control circuit 35 generates the control signal 39 to control the NFC 33 to select one smart card (i.e., the smart card 31 or smart card 32) for communication, and to control the switch circuit 36 to connect the first interface of the smart card 31 to either the NFC unit 33 or the control circuit 35. In the first embodiment, the NFC unit 33 and the control circuit 35 are respectively integrated into a single a chip.

Preferably, both of the smart cards 31 and 32 support the electronic wallet function, e.g., any tool having a payment capability for depositing electronic money, consumption points, or virtual money. The portable apparatus 30 can communicate with the external NFC reader 16 or other NFC apparatuses by using the NFC technique. For example, the NFC reader 16 sends an access command that is transmitted to the NFC unit 33 via the antenna 34 to instruct to add value to or deduct value from the smart card 31 or 32. Therefore, when the smart cards 31 and 32 respectively support different electronic wallet systems (e.g., the systems generally independently operate and lack uniformity of integration), e.g., when the smart card 31 supports a public transportation system and the smart card 32 supports a band system, a user may use different electronic wallet functions of incompatible systems via a single portable apparatus. For example, a user can determine to select one smart card for performing the electronic wallet function by a user interface (not shown), and the control circuit 35 generates an appropriate control signal 39 according to the command of the user to correspondingly control the NFC unit 33 and the switch circuit 36. The portable apparatus 30 in the first embodiment may be extended to comprising three or more than three smart cards, so as to provide to the user more types of electronic wallet functions of different systems.

Preferably, the portable apparatus 30 is a mobile phone, and at least one of the smart cards 31 and 32 supports a mobile telecommunication function. When the smart card 31 (or 32) supports the mobile telecommunication function, the portable apparatus 30 can communicate with a telecommunication network via the smart card 31 (or 32), and is connected to an electronic wallet function provider on the Internet via the telecommunication network to perform electronic transaction with the smart card 31 (or 32), e.g., an electronic wallet is value-added or value-deduced. In this embodiment, the control circuit 35 is a baseband circuit of a mobile phone.

Therefore, the portable apparatus 30 applies to two different types of approaches to add/deduct value. One approach realized by performing near-field communication between the portable apparatus 30 and an external apparatus is referred to as a practical value-added/deduced function. Another approach realized by connecting the portable apparatus 30 to an electronic wallet function provider on the Internet via the telecommunication network is referred to as virtual value-added/deduced function. The user may select a more convenient effect approach for performing electronic payment according to his requirements or ambient conditions. For example, the user may implement the practical value-added/deduced function or the virtual value-added/deduced function to increase utilization flexibility of the electronic wallet function.

Figure 4:
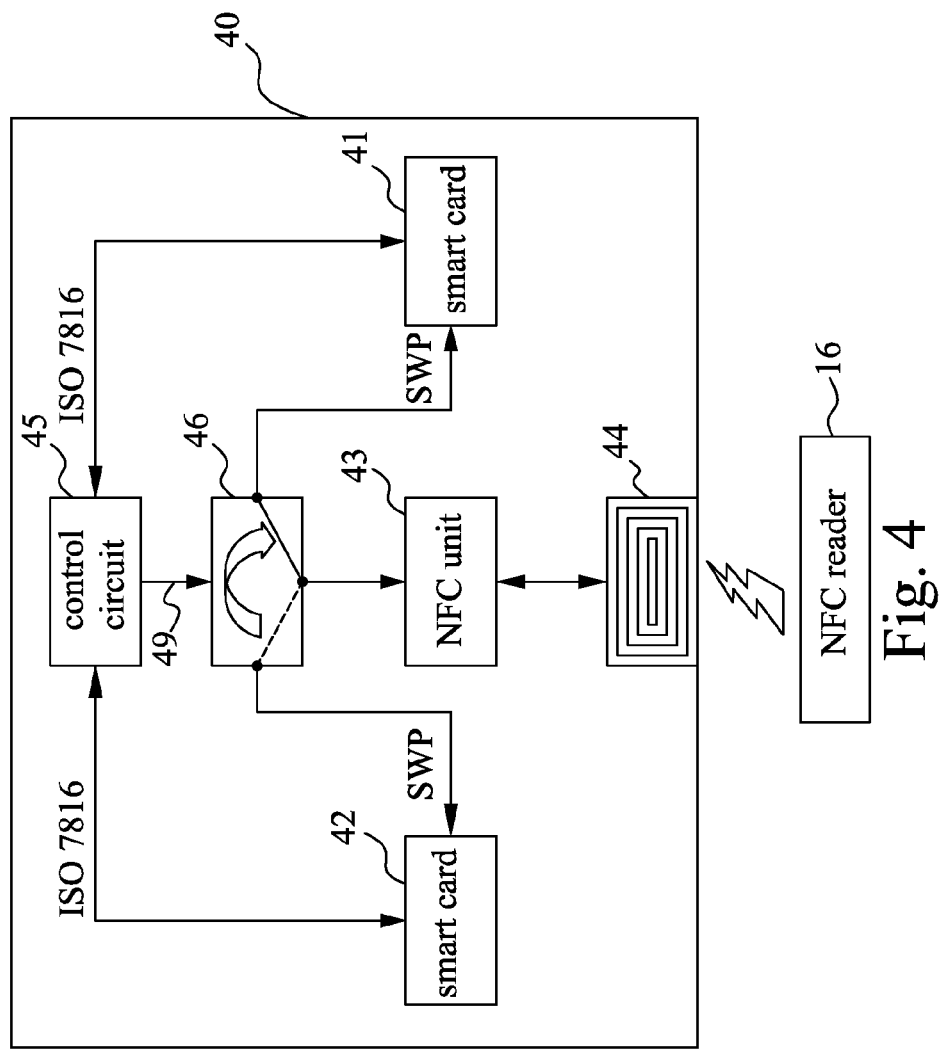
FIG. 4 is a block diagram of a portable apparatus for supporting an electronic wallet function in accordance with a second embodiment of the present invention.
Figure 5:
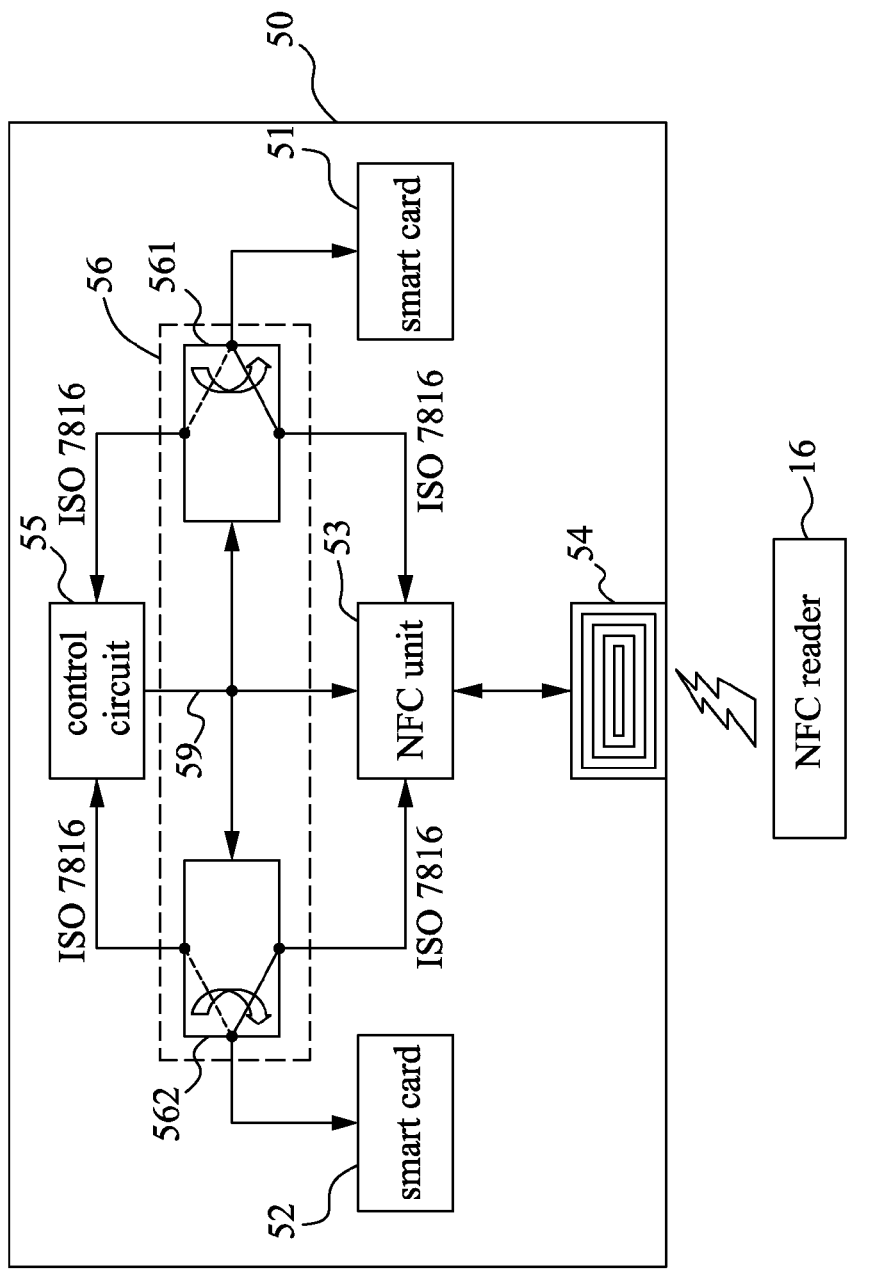
FIG. 5 is a block diagram of a portable apparatus for supporting an electronic wallet function in accordance with a third embodiment of the present invention.
Figure 6:
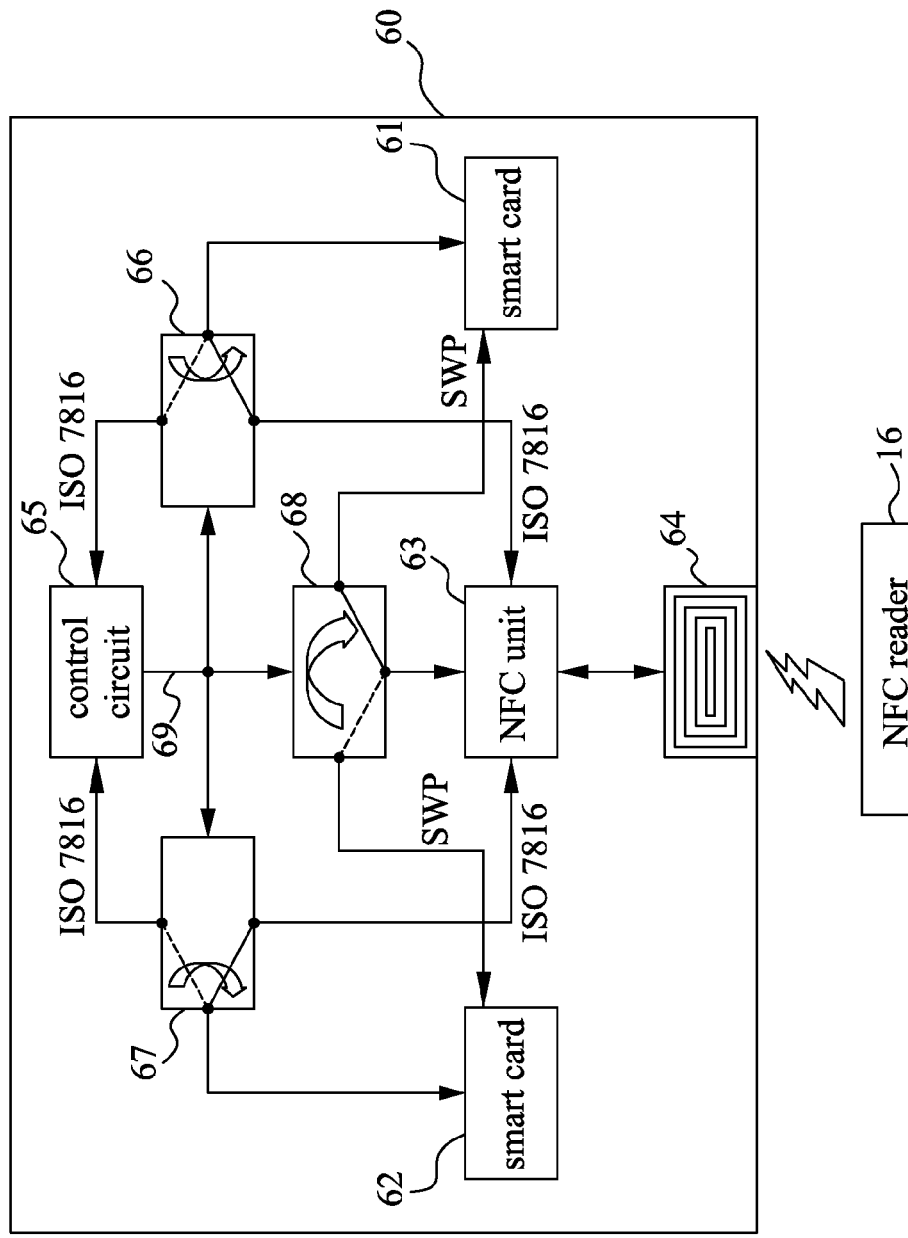
FIG. 6 is a block diagram of a portable apparatus for supporting an electronic wallet function in accordance with a fourth embodiment of the present invention.

FIG. 4 to FIG. 6 are schematic diagrams of portable apparatuses for supporting an electronic wallet function in accordance with other embodiments of the present invention. Each of the portable apparatuses comprises two smart cards (or each of the portable apparatuses is extended to comprising three or more than three smart cards) to support various electronic wallet systems that are not integrated. When one smart card supports the mobile telecommunication function, the portable apparatuses in these embodiments also provide practical/virtual value-added/value-deducted functions so as to provide more diversify in electronic payment approaches. FIG. 4 is a block diagram of a portable apparatus for supporting an electronic wallet function in accordance with a second embodiment of the present invention. A portable apparatus 40 comprises smart cards 41 and 42, an NFC unit 43, an antenna 44, a control circuit 45, and a switch circuit 46. Each of the smart cards 41 and 42 comprises an interface, e.g., an SWP interface, which is for communicating with the NFC unit 43. The NFC unit 43 is coupled to either the smart card 41 or the smart card 42 via the switch circuit 46, which is controlled to selectively connect the NFC unit 43 to either the interface of the smart card 41 or the interface of the smart card 42 according to a control signal 49 generated by the control circuit 45. The NFC unit 43 near-field communicates with the external NFC reader 16 via the antenna 44. For example, the NFC reader 16 sends an access command that is transmitted to the NFC unit 43 via the antenna 43 to instruct to add value to or deduct value from the smart card 41 or 42, i.e., the foregoing practical value-added/value-deducted function. In this embodiment, the NFC unit 43 may only comprise a single interface connected to the smart cards, and at this point, the portable apparatus 40 can still achieve an object of supporting two smart cards via the switch circuit 46.

FIG. 5 is a block diagram of a portable apparatus for supporting an electronic wallet function in accordance with a third embodiment. A portable apparatus comprises smart cards 51 and 52, an NFC unit 53, an antenna 54, a control circuit 55, and a switch circuit 56. Each of the smart cards 51 and 52 comprises an interface, e.g., an ISO 7816 interface, which is coupled to either the NFC unit 53 or the control circuit 55 at any given time. The switch circuit 56 is controlled to selectively connect the NFC unit 53 to the interface of the smart card 51 or 52 by a control signal 59 generated by the control circuit 55, so as to perform the electronic wallet function of the smart card 51 or 52. As shown in FIG. 5, the switch circuit 56 further comprises switch units 561 and 562. The switch unit 561, coupled to the NFC unit 53, the smart card 51 and the control circuit 55, switches the interface of the smart card 51 between the NFC unit 53 and the control circuit 55 according to the control signal 59. The switch unit 562, coupled to the NFC unit 53, the smart card 52 and the control circuit 55, switches the interface of the smart card 52 between the NFC unit 53 and the control circuit 55 according to the control signal 59. The NFC unit 53 near-field communicates with the external NFC reader 16 via the antenna 54 to perform practical value-added/value-deducted function on the smart card 51 or 52. In this embodiment, the smart cards 51 and 52 may comprise only one interface for connecting to external apparatuses. By appropriately controlling the switch units 561 and 562, the control circuit 55 and the NFC unit 53 are respectively connected to the smart cards 51 and 52 (or are respectively connected to the smart cards 52 and 51). Accordingly, the portable apparatus also achieves an object of simultaneously supporting two smart cards.

FIG. 6 is a block diagram of a portable apparatus for supporting an electronic wallet function in accordance with a fourth embodiment of the present invention. A portable apparatus 60 comprises smart cards 61 and 62, an NFC unit 63, an antenna 64, a control circuit 65, and switches 66, 67, and 68. A main difference between the portable apparatus in the third and fourth embodiment is that, the NFC unit 63 in the fourth embodiment comprises another interface, e.g., a SWP interface, and the interface is connected to either the smart card 61 or the smart card 62 via the switch 68 that switches according to a control signal 69. Therefore, there are two interfaces (e.g., an ISO 7816 interface and an SWP interface as shown in FIG. 6) between the NFC unit 63 and the smart cards 61 and 62 for communication, e.g., for performing practical value-added/value-deducted function.

Figure 7:
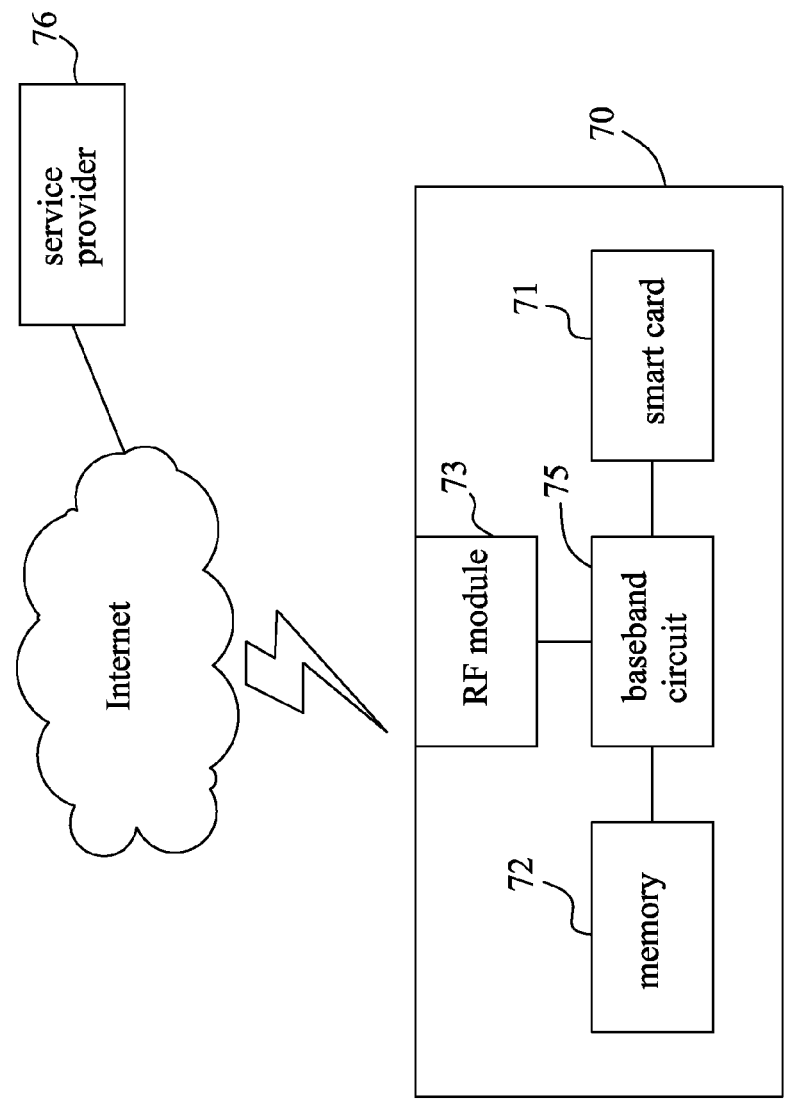
FIG. 7 is a block diagram of a portable apparatus for supporting an electronic wallet function in accordance with a fifth embodiment of the present invention.

FIG. 7 is a block diagram of a portable apparatus for supporting an electronic wallet function in accordance with a fifth embodiment of the present invention. A portable apparatus 70 comprises a smart card 71, a memory 72, a radio frequency (RF) module 73, and a baseband circuit 75. The smart card 71 supports a mobile telecommunication function of a telecommunication network, such that the portable apparatus 70 serves as a mobile phone. The RF module 73 comprises a built-in antenna (not shown) for data transmission and reception between the portable apparatus 70 and the telecommunication network. The memory 72 is stored with application software associated with the electronic wallet function, and the baseband circuit 75 accesses the memory 72 to execute the associated software, such that the portable apparatus 70 is connected to an electronic wallet service provider 76 on the Internet via the telecommunication network to add value to or deduct value from the smart card 71, i.e., the foregoing virtual value-added/value deducted function. The fifth embodiment may be integrated with the foregoing first to fourth embodiments, for example, in the foregoing embodiments, the memory 72 (comprising built-in application software associated with the electronic wallet function) and the RF module 73 are further defined and a smart card supporting the mobile telecommunication function is applied to connect the portable apparatus to the electronic wallet service provider 76 on the Internet via the telecommunication network. Accordingly, the portable apparatus is capable of simultaneously supporting the practical/virtual electronic wallet functions to further increase utilization convenience and flexibility.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A portable apparatus, comprising:
    a first smart card, comprising a first interface;
    a second smart card, comprising a second interface;
    a near-field communication (NFC) unit, coupled to the first smart card via the first interface and coupled to the second smart card via the second interface, wherein the NFC unit performs electronic transaction on either the first smart card or the second smart card according to an access command of an NFC reader; and
    a control circuit, for controlling the NFC unit to communicate with either the first smart card or the second smart card;
    wherein the first smart card supports an electronic wallet function.

2. The portable apparatus as claimed in claim 1, wherein the first interface is a Single Wire Protocol (SWP) interface, and the second interface is an International Organization for Standardization (ISO) 7816 interface.

3. The portable apparatus as claimed in claim 1, the second interface being an ISO 7816 interface, the portable apparatus further comprising:
    a switch, for switching the ISO 7816 interface of the second smart card between the control circuit and the NFC unit according to a control signal of the control circuit.

4. The portable apparatus as claimed in claim 1, wherein the portable apparatus is a mobile phone.

5. The portable apparatus as claimed in claim 1, wherein the control circuit generates the control signal according to a user command.

6. A portable apparatus, comprising:
    a first smart card, comprising a first interface;
    a second smart card, comprising a second interface;
    a near-field communication (NFC) unit, coupled to the first smart card via the first interface and coupled to the second smart card via the second interface; and
    a control circuit, for controlling the NFC unit to communicate with either the first smart card or the second smart card;
    wherein the first smart card supports a mobile telecommunication function, and the portable apparatus communicates with a telecommunication network via the first smart card and is connected to an electronic wallet service provider on the Internet via the telecommunication network to perform electronic transaction on the first smart card.

7. A portable apparatus, comprising:
    an NFC unit;
    a first smart card and a second smart card each comprising an interface;
    a control circuit, for generating a control signal; and
    a switch, for selectively connecting the NFC unit to either the interface of the first smart card or the interface of the second smart card according to the control signal; comprising:
        a first switch unit, for switching the interface of the first smart card between the NFC unit and the control circuit according to the control signal; and
        a second switch unit, for switching the interface of the second smart card between the NFC unit and the control circuit according to the control sig.

8. The portable apparatus as claimed in claim 7, wherein the interfaces are SWP interfaces.

9. The portable apparatus as claimed in claim 7, wherein the interfaces are ISO 7816 interfaces.

10. The portable apparatus as claimed in claim 7, wherein the portable apparatus is a mobile phone.

11. The portable apparatus as claimed in claim 7, wherein the first smart card supports an electronic wallet function.

12. The portable apparatus as claimed in claim 7, wherein the NFC unit performs electronic transaction on either the first smart card or the second smart card according to an access command of an NFC reader.

13. The portable apparatus as claimed in claim 7, wherein the first smart card supports a mobile telecommunication function, and the portable apparatus communicates with a telecommunication network via the first smart card and is connected to an electronic wallet service provider on the Internet via the telecommunication network to perform electronic transaction on the first smart card.

14. The portable apparatus as claimed in claim 7, wherein the control circuit generates the control signal according to a user command.

* * * * *